June 2, 1970     A. G. PEIFER ET AL     3,515,464

MONOCHROMATIC PRISM ASSEMBLY FOR LASER APPLICATION

Filed July 20, 1967

INVENTORS.
ALBERT G. PEIFER,
MATTHEW C. STARR,
BY J K Haskell
ATTORNEY.

3,515,464
MONOCHROMATIC PRISM ASSEMBLY FOR
LASER APPLICATION
Albert G. Peifer, Woodland Hills, and Matthew C. Starr,
Los Angeles, Calif., assignors to Hughes Aircraft Company, Culver City, Calif., a corporation of Delaware
Filed July 20, 1967, Ser. No. 654,899
Int. Cl. G02b 7/18
U.S. Cl. 350—286                      2 Claims

ABSTRACT OF THE DISCLOSURE

A prism assembly including means for obtaining alternatively either single wavelength or multiwavelength emission from a laser light source without interchange or realignment of the optics.

---

This invention relates to optical prisms, and more particularly, but not necessarily exclusively, to an optical prism assembly including means for obtaining alternatively either single, or monochromatic, wavelength or multiwavelength emission from a light source. The invention is especially useful with gas laser sources where it is desired to produce single or multiwavelength light alternatively and precisely, without interchange or realignment of the optics.

Operation of prism assemblies to which the present invention appartains is based upon aligning a mirrored surface of the prism normal to the axis of a laser beam to obtain a full, or multiwavelength, emission spectrum, then rotating the prism so that the laser beam is incident to the prism at a suitable angle for obtaining the single wavelength desired.

In the use of prior art prism assemblies, it has been necessary to actually interchange the prism in an assembly where single wavelength emission is desired for a mirror where multiwavelength is desired, with attendant difficulties of operational delay and alignment corrections.

Accordingly, an important object of the present invention is to provide an improved prism assembly including improved means for rapid and precise alignment with an optical beam incident thereto.

Another object of the invention is to provide a prism assembly with coexisting means for producing single wavelength and multiwavelength emissions alternatively.

A further object of the invention is to provide a prism having half the front surface thereof, and all the back surface opposite thereto, mirrored, said prism mounted so as to allow rotation over a wide angle with extreme precision and appropriate and exact stops.

Figure 1:
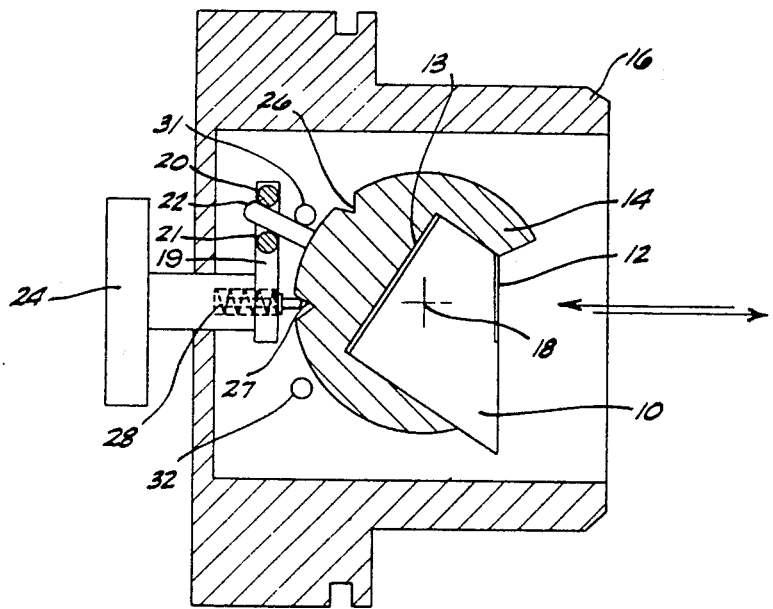
Figure 2:
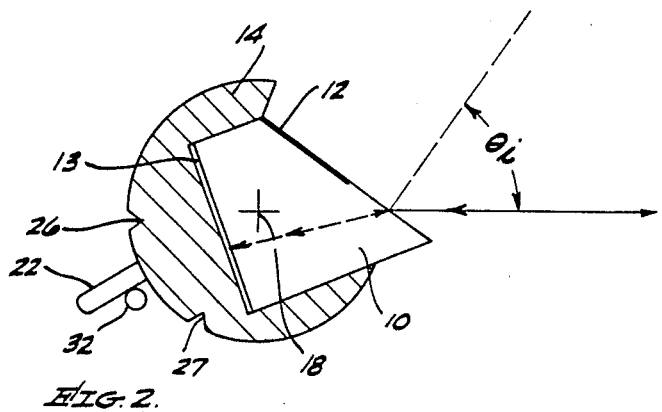

The foregoing and other objects and advantages of the present invention will become apparent in the following detailed description of a representative embodiment thereof, with reference to the accompanying drawings, in which:

FIG. 1 is a partial cross-sectional view of a prism assembly according to the invention, in position for multiwavelength emission; and FIG. 2 is a view similar to FIG. 1 in which the prism assembly is in an alternative position for single wavelength emission.

Referring now to the drawing, when a prism assembly according to the invention is in the position illustrated in FIG. 1, which is the position for multiwavelength emission, half-mirrored front surface 12 of a prism 10 is perpendicular to an incident laser beam. The prism 10 may be of any desired material, the selection criteria being low transmission loss and high surface polish. Mirrored surface 12 may be a multilayer dielectric mirror, favored because of durability under laser conditions, substantial resistance to the effects of moisture or scratching, and because of spectral response in accordance with the laser source, as argon, krypton or the like. As illustrated in FIG. 1, quartz, prism 10 has approximately half of the front surface 12 thereof dielectrically mirrored, and has a back surface 13 thereof also dielectrically mirrored. When the prism 10 is in a first position as illustrated in FIG. 1, the incident laser beam will be reflected by the half mirrored front surface 12 and essentially no laser energy will reach the back surface 13. Thus, all of the wavelengths of the incident laser beam will be reflected back along the path of incidence. The prism 10 is mounted on a prism mount 14 so that any rotation of the prism mount will cause a corresponding rotation of the prism 10. The prism mount 14 is rotatably mounted in an aluminum cylinder 16 so that the prism 10 may be rotated about an axis 18 perpendicular to the path of the laser beam. The prism mount 14 may be rotated within the housing 16 by means of a forked support having a rotatable arm 19 which carries prongs 20 and 21 that engage a guide pin 22. The space between prongs 20 and 21 functions as a guide slot for pin 22. A rotatable knob 24 is connected to arm 19 so that when knob 24, and hence arm 19, is roated pin 22 moves longitudinally within the guide slot between prongs 20 and 21. Pin 22 is thus constrained to rotate in the plane of the paper about axis 18. Thus, by rotating the knob 24, the prism 10 can be rotated about its axis causing a change in the angular orientation of the front surface of the prism with respect to the incident laser beam. The radial surface of the prism mount 14 is provided with notched slots 26 and 27 to engage a spring-loaded plunger 28 attached to knob 24. The surfaces of notched slots 26 and 27 are such that the spring-loaded plunger 28 will come to bear against a side of one or the other of the slots 26 and 27, depending upon the orientation of the prism mount 14 with respect to stops 31 and 32. The force provided by spring-loaded plunger 28 thus causes guide pin 22 to bear against stop 31 or 32; hence stops 31 and 32 may be adjusted initially to precisely set the limitation of the rotation of prism mount 14.

Referring now to FIG. 2, the prism 10 is illustrated in a position for single wavelength, or monochromatic, emission. In this position the prism 10 is oriented with respect to the incident laser beam so that the non-mirrored portion of the front surface of the prism 10 is presented to the incident laser beam at an angle of incidence $\theta_1$. The angle $\theta_1$ corresponds to the Brewster angle for the particular wavelength desired.

Hence, the prism 10 can be moved between a first position as illustrated in FIG. 1 for multiwavelength laser emission and a second position as illustrated in FIG. 2 for a desired particular wavelength laser emission. When the prism 10 is in the second position, a particular wavelength of the incident laser beam is dispersed to impinge upon the mirrored back surface 13 of the prism 10 and be reflected substantially 99.9 percent along the path of incidence. In this position only one wavelength from the incident laser beam will be suitably oriented for emission in the high gain laser cavity. An exact single wavelength may be obtained by means of $(x, y)$ fine-adjustment knobs provided with a gear box in the laser mount itself (not shown herewith).

What is claimed is:
1. A laser cavity prism assembly for selectively reflecting either all or a selected one of a plurality of wavelengths in a laser beam comprising:
   a support;
   mounting means rotatably mounted on said support for carrying a prism having a front surface and a back surface, a portion of said front surface and at least a portion of said back surface being mirrored; and
   means for rotating said mounting means between a first position wherein said mirrored portion of said front surface of said prism will reflect a plurality of wavelengths of the incident laser beam back along the path of incidence, and a second position wherein a particular wavelength of the laser beam will be reflected back along the path of incidence by said mirrored portion of said back surface of said prism.

2. An assembly according to claim 1 wherein said means for rotating includes:
   a knob rotatably mounted with respect to said support about an axis of rotation parallel to that of the laser beam;
   guide means attached to said knob for rotational movement therewith and including a forked member defining a guide slot; and
   a pin attached to said mounting means and adapted for longitudinal movement in said guide slot such that rotational movement of said knob effects corresponding rotational movement of said mounting means.

References Cited

UNITED STATES PATENTS

| | | | |
|---|---|---|---|
| 3,145,251 | 8/1964 | Woodson | 88—14 |
| 3,358,243 | 12/1967 | Collins et al. | 331—94.5 |
| 3,388,342 | 6/1968 | White | 331—94.5 |

FOREIGN PATENTS 618,527  5/1932  Germany.

DAVID SCHONBERG, Primary Examiner

M. J. TOKAR, Assistant Examiner

U.S. Cl. X.R.

331—94.5